Figure 11:
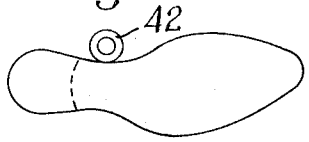

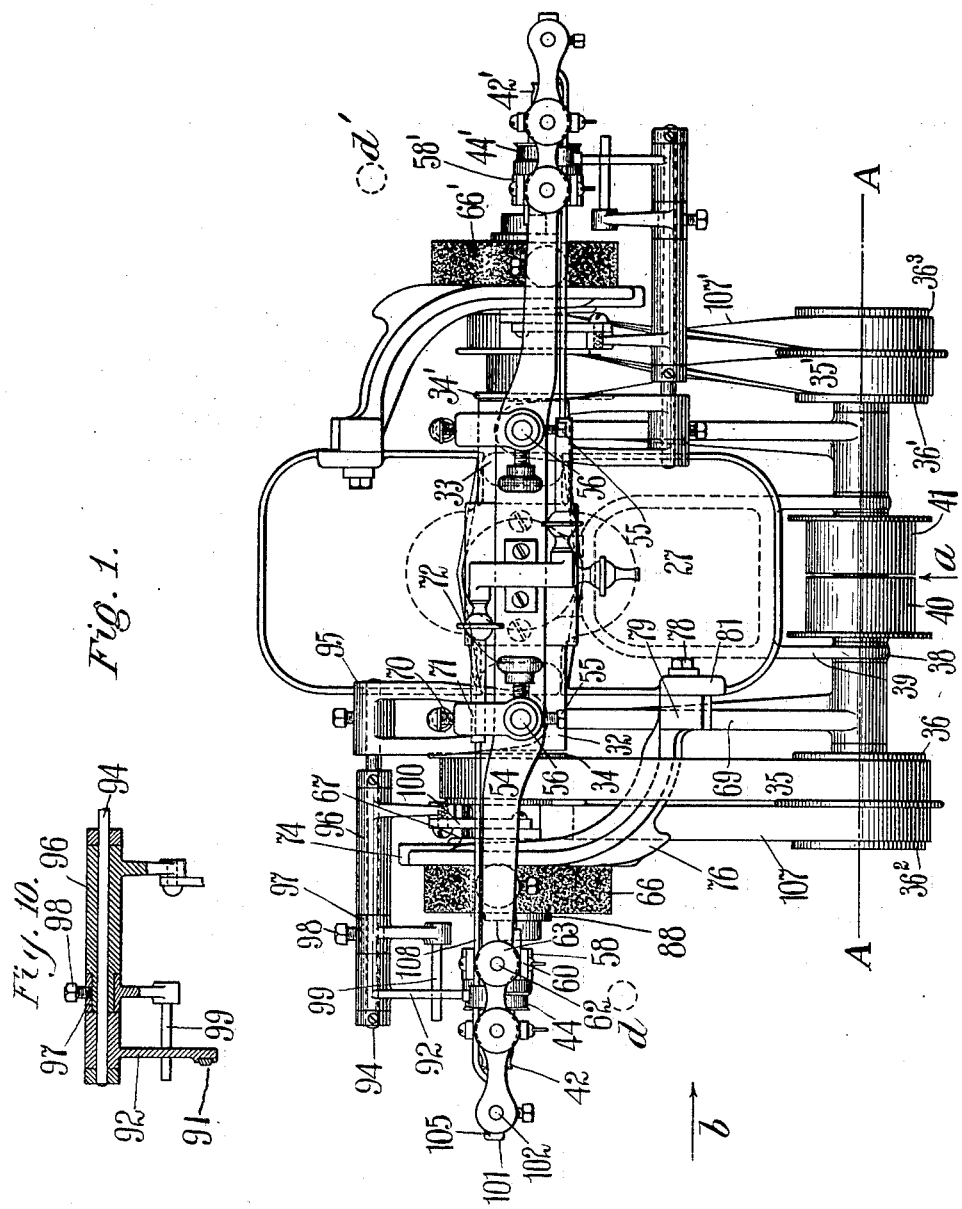

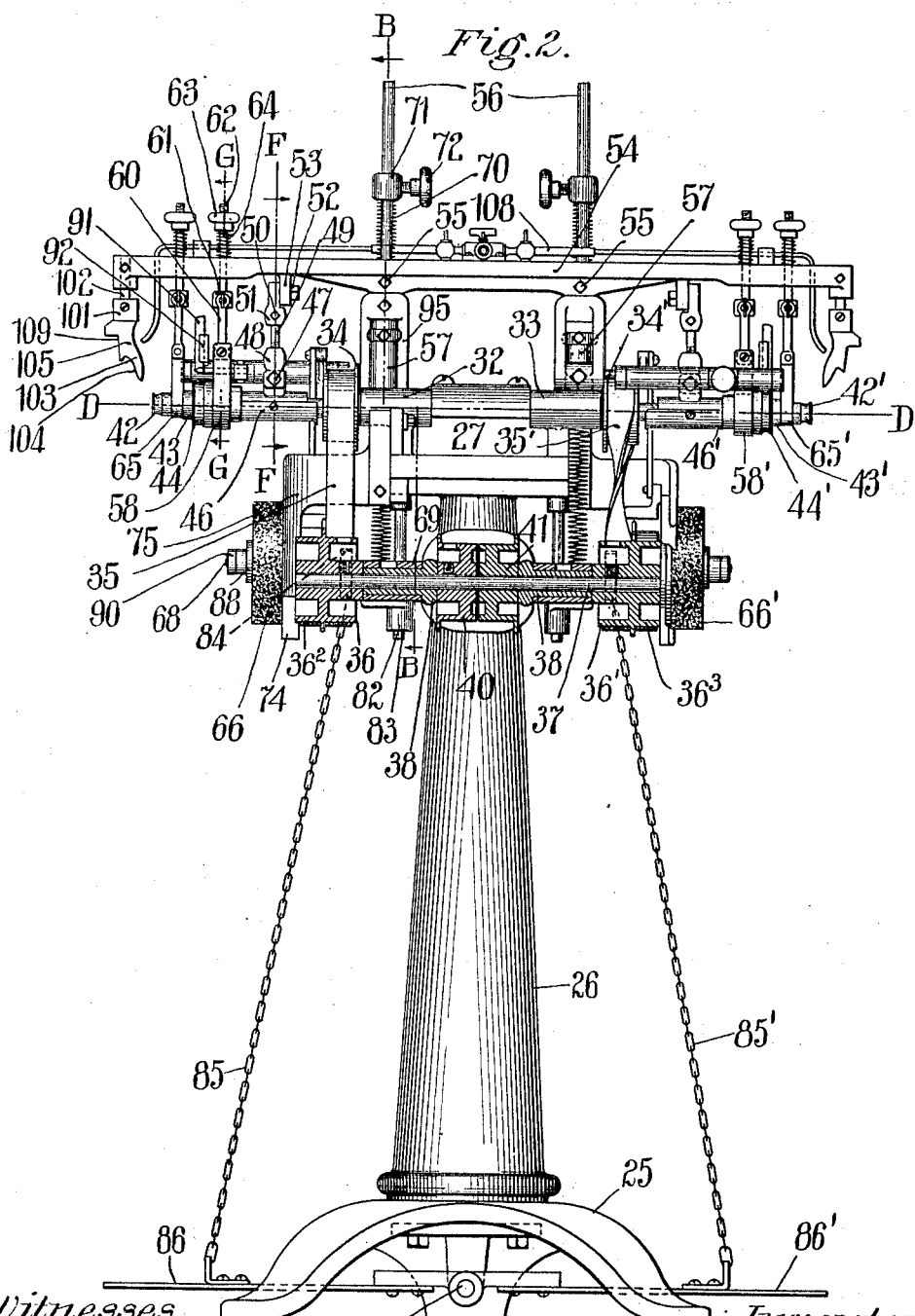

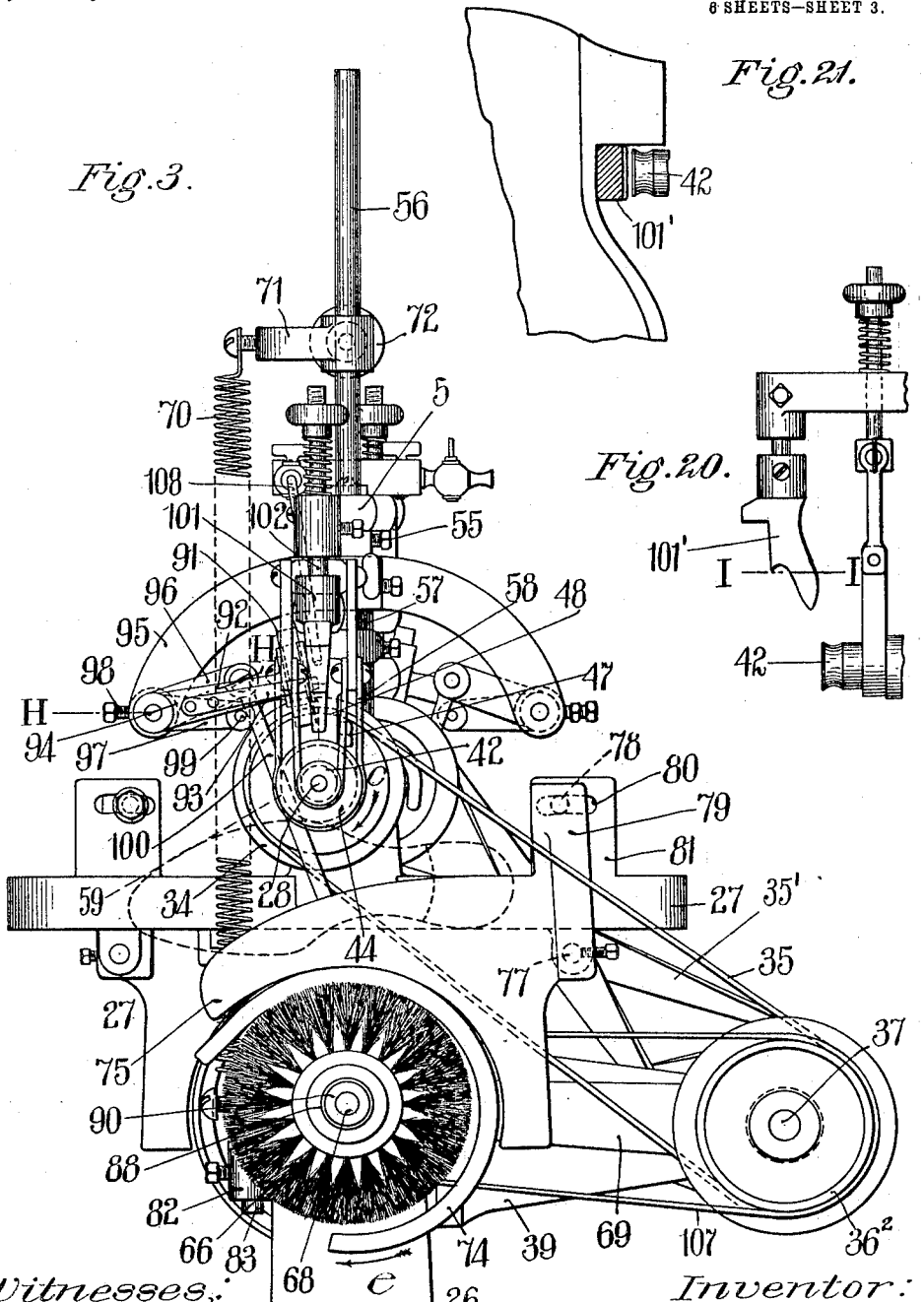

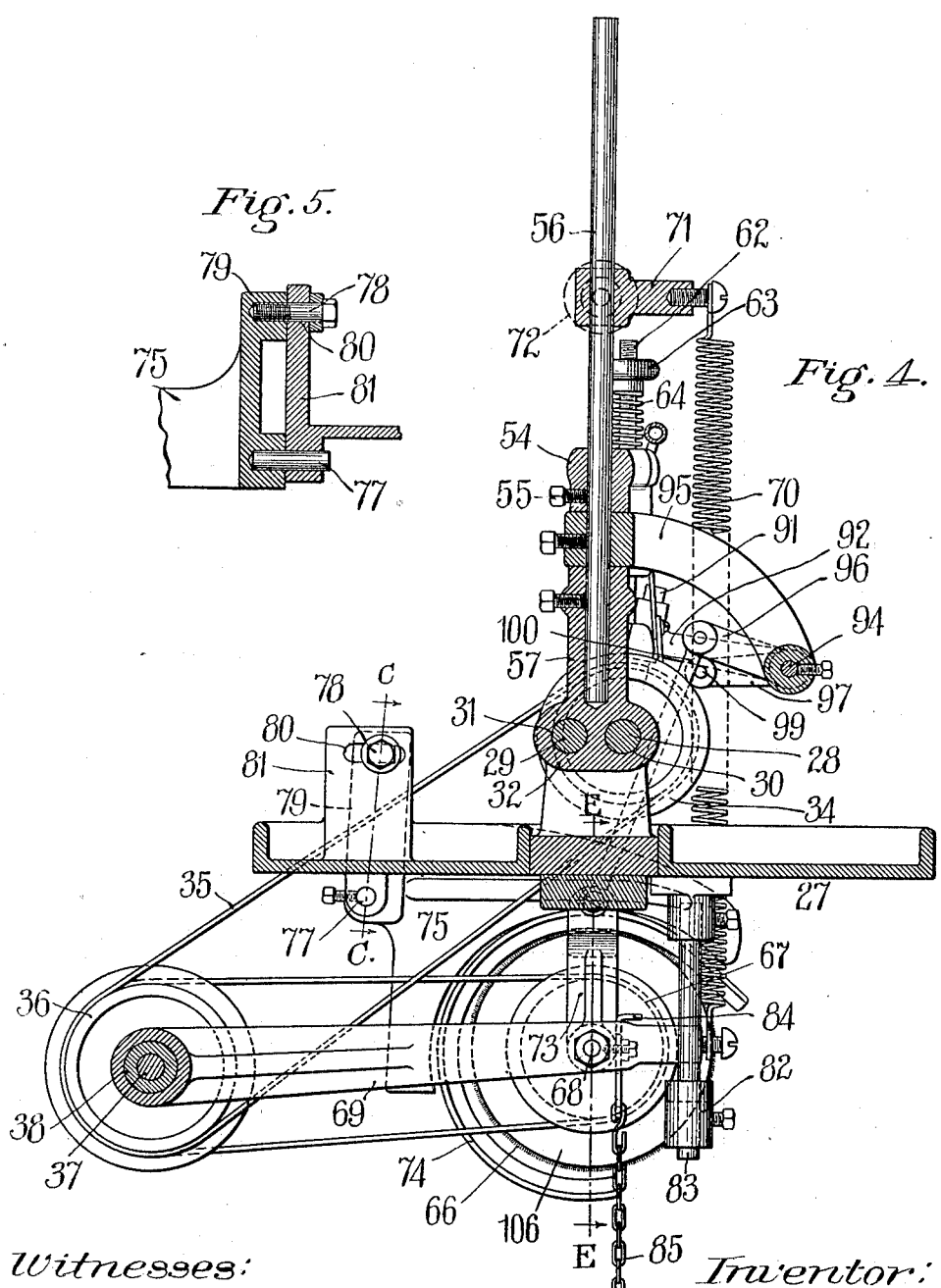

Z. BEAUDRY.
MACHINE FOR SETTING, BURNISHING, AND BRUSHING THE EDGES OF THE SOLES OF BOOTS AND SHOES.
APPLICATION FILED AUG. 25, 1908. RENEWED MAR. 5, 1914.
1,113,089.
Patented Oct. 6, 1914.
6 SHEETS—SHEET 5.
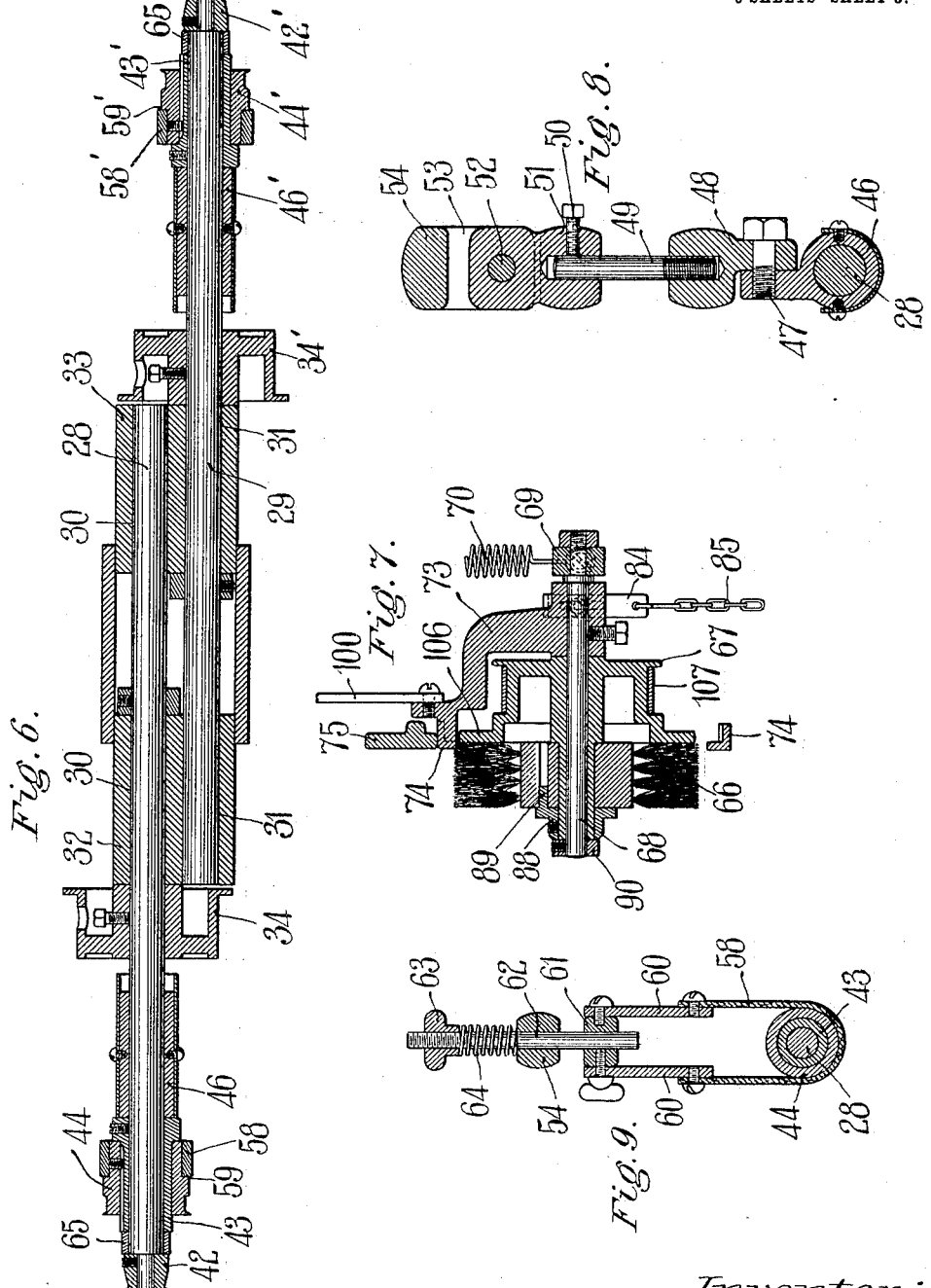
Witnesses:
Ernest A. Telfer
Sydney E. Taft
Inventor:
Zotique Beaudry
by his attorney Charles S. Gooding Z. BEAUDRY.
MACHINE FOR SETTING, BURNISHING, AND BRUSHING THE EDGES OF THE SOLES OF BOOTS AND SHOES.
APPLICATION FILED AUG. 25, 1908. RENEWED MAR. 5, 1914.

1,113,089.

Patented Oct. 6, 1914.
6 SHEETS—SHEET 6.

Witnesses:
Ernest A. Telfer
Sydney C. Taft

Inventor:
Zotique Beaudry,
by his attorney, Charles F. Gooding.

UNITED STATES PATENT OFFICE.

ZOTIQUE BEAUDRY, OF LYNN, MASSACHUSETTS, ASSIGNOR TO HAMEL SHOE MACHINERY CO. INC., OF LYNN, MASSACHUSETTS, A CORPORATION OF MASSACHUSETTS.

MACHINE FOR SETTING, BURNISHING, AND BRUSHING THE EDGES OF THE SOLES OF BOOTS AND SHOES.

1,113,089.        Specification of Letters Patent.        Patented Oct. 6, 1914.

Application filed August 25, 1908, Serial No. 450,217. Renewed March 5, 1914. Serial No. 822,766.

*To all whom it may concern:*

Be it known that I, ZOTIQUE BEAUDRY, a citizen of the United States, residing at Lynn, in the county of Essex and State of Massachusetts, have invented new and useful Improvements in Machines for Setting, Burnishing, and Brushing the Edges of the Soles of Boots and Shoes, of which the following is a specification.

This invention relates to machines for setting, burnishing and brushing the edges of the soles of boots and shoes, the object of the invention being to provide a machine of the class set forth which is so constructed and arranged that two operators may utilize the machine at the same time for the purpose set forth, the shank and fore part tools and the polishing brush being duplicated on opposite sides of the machine but rotated in opposite directions, and all of said rotary parts rotated from a common main driving shaft, thus providing a simple, compact and convenient machine.

The invention relates further to improvements for waxing the edge setting tools, which means may be utilized at the will of the operator to apply wax to the edge burnishing iron for any desired length of time, the machine also being capable of having wax applied to the rotary shank burnishing iron, if so desired, and this wax supplying means may be utilized by the operator either by the use of the treadle or by pressing upon the brush with the shoe, as may be desired. In its normal position the wax is held out of contact with the rotary edge burnishing iron, but may be brought into contact with said iron and held in contact therewith for any desired time at the will of the operator, either, as hereinbefore stated, by operating the treadle or by pressing upon the polishing brush with the shoe.

This invention also relates to certain improved means for heating the rotary fore part and shank setting tool, said means preferably serving a two-fold purpose, viz., to heat said tools and to serve as a rest for the finger of the operator during the operation of setting the fore part and still further to protect the upper of the shoe from contact with the rotary edge setting tool.

The invention further relates to certain improved means for setting the edge of the shank portion of the sole in the immediate vicinity of the heel breast. The shank burnishing tool being a rotary cylindrical tool cannot be brought into contact with the edge of the shank of the sole in the immediate vicinity of the heel breast, especially when the edge of the shank of the shoe sole is "cut in" at the corners immediately adjacent to the heel breast.

The invention again relates to certain details of construction for supporting the shafts to which the edge setting tools are fastened and also to means for supporting the bristles of the brushes against lateral pressure.

The invention finally consists in a machine of the character described of the combination and arrangement of parts set forth in the following specification and particularly pointed out in the claims thereof.

Referring to the drawings: Figure 1 is a plan view of my improved machine for setting, burnishing and brushing the edges of the soles of boots and shoes as embodied in a twin-machine or in a machine which is adapted to be used by two operators at the same time. Fig. 2 is a sectional elevation taken on line A—A of Fig. 1, as viewed from the front of the machine or in the direction of the arrow *a* in said figure. Fig. 3 is a left hand side elevation of the machine, partly broken away, viewed in the direction of the arrow *b*, Fig. 1, a shoe sole being indicated in dotted lines therein, with its edge in contact with the periphery of the fore part burnishing tool. Fig. 4 is an enlarged sectional elevation taken on line B—B of Fig. 2, as viewed in the direction of the arrows on said line. Fig. 5 is a detail sectional elevation taken on line C—C of Fig. 4 viewed in the direction of the arrows on said line. Fig. 6 is a sectional plan enlarged taken on line D—D of Fig. 2. Fig. 7 is a sectional elevation taken on line E—E of Fig. 4 viewed in the direction of the arrows on said line. Fig. 8 is a sectional elevation taken on line F—F of Fig. 2 viewed in the direction of the arrows on said line. Fig. 9 is a sectional elevation taken on line G—G of Fig. 2 viewed in the direction of the arrows on said line. Fig.

Figure 16:
Figure 15:
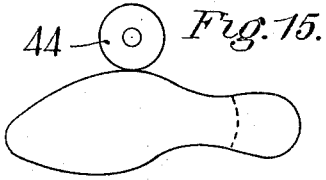
Figure 17:
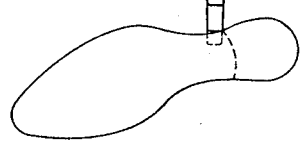
Figure 18:
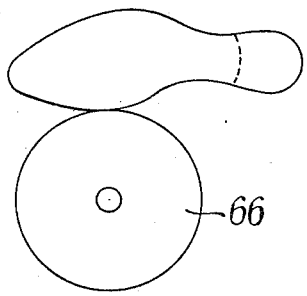
Figure 19:
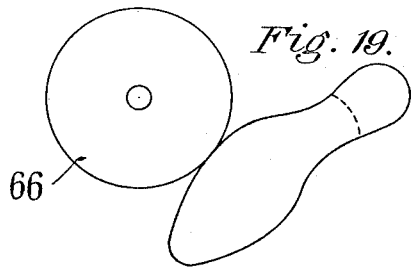

10 is a detail sectional elevation taken on line H—H of Fig. 3. Figs. 11 to 17 inclusive are diagrammatic views illustrating the different positions of the shoe sole with relation to the edge setting iron. Figs. 18 and 19 are diagrammatic views illustrating the position of the shoe with relation to the brush. Fig. 20 is a front elevation of a modified form of my invention illustrating the stationary shank burnishing iron and the rotary shank burnishing iron. Fig. 21 is a detail sectional plan taken on line I—I of Fig. 20.

Like numerals refer to like parts throughout the several views of the drawings.

In the drawings, 25 is the base of the machine, 26 the column and 27 the frame. The frame 27 has two parallel shafts 28 and 29 journaled to rotate in bearings 30, 30 and 31, 31, respectively, said bearings being formed in bosses 32 and 33 on the frame 27. The shaft 28 is extended to the left beyond the frame and has fastened thereto a pulley 34 which is driven by a straight belt 35 and pulley 36 in the direction of the arrow $c$ (Fig. 3). The pulley 36 is fastened to the main driving shaft 37, which is journaled to rotate in bearings 38, 38 formed in a bracket 39 fast to the column 26.

The main driving shaft 37 is driven by a pulley 40 fast thereto, there being also a loose pulley 41 mounted upon the shaft 37 to receive the driving belt when the main driving shaft is stationary.

The shaft 28 is shouldered down at its left hand outer end and has fastened thereto the rotary shank burnishing tool 42. Said shaft 28 has also fastened thereto a sleeve 43 to which is fastened the fore part edge setting tool 44. It will be noted that the diameter of the sleeve 43 is slightly larger than the diameter of the shank burnishing tool 42, so that the hole in the fore part edge setter is of sufficient size to allow said edge setter 44 to be placed upon the sleeve 43 or taken off of said sleeve without removing the shank setting tool 42.

The shaft 29 is prolonged beyond the frame of the machine toward the right (Fig. 6) and has fastened thereto the pulley 34', the shank setting tool 42' and the fore part edge setting tool 44', the edge setting tool 44' being fastened to a sleeve 43' which is directly fastened to the shaft 29. The pulley 34' is driven in the opposite direction to that of the pulley 34 by a cross-belt 35' which is driven by a pulley 36' fast to the main driving shaft 37. Thus, it will be seen that the shafts 28 and 29 are driven in opposite directions. The operators, however, stand on opposite sides of the machine in the positions indicated by the dotted circles $d$ and $d'$, respectively, (Fig. 1), so that the motion of the edge setting tools relatively to the operators is the same, although relatively to the frame of the machine said shafts rotate in opposite directions.

As the shafts 28 and 29 project to some extent beyond the bearings in the frame of the machine, it is necessary that these shafts should be supported, especially as to their upper sides, by auxiliary bearings, and to that end the shaft 28 is supported in an auxiliary bearing 46 and the shaft 29 in an auxiliary bearing 46' (Figs. 2, 6 and 8). The bearing 46 is fastened by a pivotal screw 47 to a block 48, the block 48 having screw-threaded engagement with a vertical pin 49 which constitutes a vertical pivot around which the bearing 46 may be swung. The pin 49 is fastened at its upper end by a screw 50 to a block 51 which is fastened by a pivotal screw 52 to an ear 53 depending from a cross-head 54 which extends across the machine and is fastened by screws 55, 55 to two upright posts 56, 56, said posts extending downwardly through the cross-head and being fastened at their lower ends in bosses 57, 57 which bosses extend upwardly from the bosses 32, 33 on the frame 27. (See Figs. 2 and 4).

It will be seen that the pivotal screw 47 extends transversely of the shaft 28 and that the pivotal screw 52 extends parallel to said shaft. The auxiliary bearing 46' is universally adjustable and is supported from the cross-head 54 in the same manner as the auxiliary bearing 46. In order to adjust the bearing 46 vertically the screw 50 is loosened and the pin 49 raised or lowered in the socket provided therefor in the block 51 until the bearing is at the required height or resting firmly on the top of the shaft 28, whereupon the screw 50 is tightened. In order to tip the bearing laterally the screw 52 is loosened, thus allowing the block 51, pin 49, block 48 and screw 47 to be swung laterally about the screw 52 as a pivot, and when said bearing has been moved to the required position the screw 52 is tightened. The bearing 46 may also be tipped about the horizontal pivot 47 which extends transversely thereof and the bearing 46 may also be swung about the pin 49 as a vertical pivot. Thus it will be seen that the bearing 46 is universally adjustable, the same being true of the bearing 46'.

When the fore part of the sole is being set upon the fore part setting tool 44, it is necessary that said tool should be heated and for this purpose I prefer to employ a strap 58 which answers the two-fold purpose of heating the iron 44 and also forms a rest for the fore finger of the operator's hand, whereby he can apply a steady pressure on the edge of the sole to the rapidly rotating fore part edge setter 44 without fear of burning or injuring his hand by contact with said hot iron. This strap 58 (see Figs. 6 and 9) extends around beneath the iron 44 and rests in a groove 59 formed in the rear part of said iron, said groove being of less depth than the thickness of the strap 58. The strap 58 is formed in a U-shaped loop, the upper ends of said strap being fastened to plates 60, 60 which, in turn, are fastened to the collar 61. The collar 61 is fastened to the lower end of a rod 62 which projects upwardly through a hole formed in the cross-head 54, said rod extending upwardly beyond the top of the cross-head and being screw-threaded at its upper end to engage a hand-nut 63. A spiral spring 64 encircles the rod 62 between the top of the cross-head 54 and the hand-nut 63 so that by screwing said hand-nut in one direction the spring 64 may be tightened and the friction upon the edge setting iron increased and by screwing said hand-nut in the opposite direction the tension upon the spring 64 will be loosened and the friction upon the edge setting iron decreased.

A strap 58' is arranged at the right hand side of the machine in a similar manner to apply friction to the edge burnishing tool 44'. Straps 65 and 65' are also provided to supply friction and heat to the shank burnishing irons 42 and 42', respectively, the means for increasing or diminishing the tension upon the strap and therefore, the friction upon these irons being substantially the same as hereinbefore described with relation to the means for applying friction and heat to the fore part burnishing irons.

In order to apply wax to the periphery of the edge setting tool at the will of the operator, I have arranged a waxing device so that the wax is normally held out of contact with the periphery of the edge burnishing tool and may be brought into contact therewith in two ways, one by depressing the brush, the other by depressing the treadle. The specific mechanism for doing this will now be described. Opposite sides of the machine being duplicates the description for one side will be equally applicable to the opposite side. The brush 66 (Fig. 7) is fastened to the hub of a pulley 67 which is journaled to rotate upon a stationary shaft 68, said stationary shaft being fastened to an arm 69 pivotally mounted upon the outside of the left hand bearing 38. A spring 70 is attached at its lower end to the arm 69 and at its upper end to a bracket 71 which in turn, is adjustably fastened by means of a hand nut 72 to the rod 56. A bracket 73 is fastened to the stationary shaft 68 between the arm 69 and the pulley 67 and this bracket has fast thereto or cast thereon a guard 74 which extends partly around the pulley 67 adjacent to the inner side of the brush 66 and extends laterally slightly beyond said pulley adjacent to the periphery of said brush. This guard 74, it will be seen, moves up and down with the brush and with the pulley 67 and when the brush is in its uppermost position said guard strikes against a stationary guard 75 which thus forms a stop to regulate the height to which the brush shall be raised by the spring 70. The stationary guard 75 extends partly around outside of the movable guard 74 and is curved backwardly at 76 to clear the heel of the shoe and as the same is being brushed. Said guard 75 is fastened by a set-screw to a pivotal pin 77 which is adapted to rock in the frame 27. A screw 78 has screw-threaded engagement with an upwardly projecting arm 79 on said guard and extends through a slot 80 provided in an upwardly extending arm 81 upon the frame 27, so that by means of this screw 78 and the slot 80 the guard 75 may be set in different positions relatively to the brush 66. The downward movement of the brush is limited by another stop consisting of a bracket 82 fast to a rod 83 which is rigidly fastened at its upper end to the frame of the machine.

A plate 84 is adjustably fastened to the bracket 73, said plate being connected by a chain 85 to a treadle 86 which is pivoted at 87 to the base of the machine. A treadle 86' is also pivoted at 87 to the base of the machine and is connected by a chain 85' to the movable support of the brush 66', said movable support in its details being substantially the same as that hereinbefore described with relation to the brush 66, it being understood that the movable support for the brush 66 consists of the arm 69 and the stationary shaft 68 fast to said arm. The brush 66 is fastened to the hub of the pulley 67 by a collar 88, this collar having a pin or projection 89 thereon which projects into a hole provided therefor in the hub of the brush 66. Another collar 90 fast to the stationary shaft 68 prevents the pulley and the brush from moving longitudinally of the shaft 68 in one direction, while the bracket 73 prevents said pulley from moving longitudinally of the shaft in the opposite direction.

A stick of wax 91 is held in a suitably formed recess in the end of a rocker arm 92 by a flat spring 93 fast to said rocker-arm (Fig. 3). Said rocker-arm is loosely mounted upon a stationary shaft 94, which stationary shaft is rigidly fastened to a forked bracket 95, the upper end of which is fastened to one of the posts 56. Another rocker-arm 96 is loosely mounted upon the shaft 94 and has another rocker-arm 97 adjustably fastened thereto by means of a set-screw 98. This latter rocker-arm 97 has a horizontal pin 99 fast thereto and extending away from the brush 66 and beneath the rocker-arm 92. (Figs. 1 and 10).

The rocker-arm 96 is connected by a link 100 to the upper end of the bracket 73 which is fast to the stationary shaft 68 and, in effect, forms a portion of the brush support. Thus it will be seen that the brush support is connected by the link 100 to the waxing device in such a manner that in its normal position—that is, when the brush is raised, the link 100 will be moved upwardly, thus rocking the rocker arm 96 upwardly and also the rocker-arm 97, which raises the pin 99 and thus lifts the rocker-arm 92 to which the wax is attached. Thus normally the wax will be out of contact with the periphery of the edge burnishing tool. When, however, the brush is depressed by the operator pushing down on the upper side thereof with the shoe in the brushing operation, said brush, together with its holder, or arm 69, will be depressed, together with the pulley 67, the bracket 73, the lik 100, and the rocker-arms 96 and 97, and the pin 99 will thus be moved away from the under side of the bracket 73, the link 100, and the rocker-arms to be moved downwardly by gravity until the lower end of the stick of wax 91 is brought into contact with the periphery of the edge burnishing iron.

If desired, the shaft 94 could be extended toward the left (Fig. 1) and another rocker-arm with wax thereon could be mounted loosely upon said shaft 94, and to this latter bracket 73, the link 100, and the rocker-arms which could be made to contact with the periphery of the shank burnishing tool, if desired, but for all practical purposes in the setting of the edges of boots and shoes it is sufficient to directly wax the burnishing iron which is adapted to set the edge of the sole of the fore part of the shoe, the shank burnishing iron being indirectly waxed and applying wax to the shank portion of the sole by wax which it obtains from the fore part.

In order to burnish that portion of the shank of the shoe immediately adjacent to the breast of the heel, a stationary burnishing iron 101 is supplied, this iron also being duplicated at opposite sides of the machine and having a shank 102 thereon which projects upwardly into the crosshead 54 to which it is rigidly fastened. This stationary edge burnishing iron is heated by any desirable means, but preferably by means of a gas flame conducted thereto by a pipe 108 (Fig. 2). Said stationary edge burnishing iron 101 has a finger 103 projecting downwardly therefrom and formed on its outer face with a recess 104 to conform to the cross sectional contour of the edge of the shoe sole adjacent to the breast of the heel. The opposite faces 105 of said finger are preferably flat. In some cases the outside of the sole adjacent to the breast of the heel is not "cut in"; it is left flat or practically a continuation of the surface of the side of the heel in front of the breast thereof and to set and burnish shoes of this character, it is necessary that the stationary edge burnishing iron 101 should have, besides the recess 104, a recess 109 which conforms to the shape of the shank in such cases as just set forth. It will be seen that the stationary edge burnishing tool 101 has a plurality of recesses formed on its outer face to conform to different cross sectional contours of the edges of shoe soles adjacent to the breast of the heel.

In order to prevent the bristles from being spread out laterally when pressure is applied to the brush, thus injuring the bristles and reducing the life of the brush, I provide a flange 106 upon the pulley 67 and this flange extends outwardly from the pulley adjacent to the side of the brush, almost to the outer periphery thereof, but leaving a slight projection of the bristles beyond its outer periphery. This flange 106, therefore, forms a support for the bristles to prevent their being pushed out laterally and crumpled and destroyed by the pressure of the edge of the sole against the brush. While I have shown the flange 106 integral with the pulley 67, it is evident that the same may be made as a disk operated from the pulley and fastened rigidly to the hub of the pulley, if desired, the function in the latter case being, however, the same as that of the flange 106, viz., that of supporting the bristles against lateral displacement. The pulley 67 is connected by a straight belt 107 to the pulley $36^2$ (see Figs. 1 and 2) so that the brush 66 is rotated in the direction of the arrow $e$ (Fig. 3). The brush 66' is rotated in the opposite direction to that of the brush 66 by means of a cross-belt 107' driven by the pulley $36^3$. The direction of rotation, however, of the brushes 66 and 66' relatively to the operator is the same.

Figure 12:
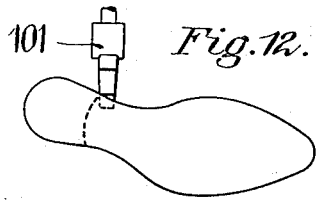
Figure 13:
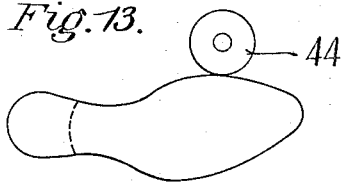
Figure 14:
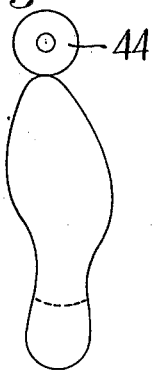

The general operation of the machine hereinbefore specifically described is as follows: In the following description, reference being had to the operation of setting and burnishing the shoe as done at the left of the machine (see Figs. 1 and 2), the operation when done at the right being substantially the same, this description will cover the operation for both sides of the machine. The operator first grasps the shoe and holds the same as illustrated in Fig. 11, with the edge of the shank portion of the sole against the under side of the shank burnishing iron. After the shank portion has been set upon one side of the shoe, the operator moves the shoe relatively to the stationary edge burnishing iron to the position shown in Fig. 12 and pushes the shoe up against the finger 103 in the recessed outer face 104 or 109, according to the style of shoe and pressing the shank of the shoe against this finger in the immediate neighborhood of the breast of the heel, pulls the shoe forward until the breast of the heel contacts with the side face of the finger which is away from the operator, as shown in Fig. 12. Having thus burnished the shank of the sole upon one side and in the vicinity of the heel, the operator holds the edge of the fore part against the under side of the fore part burnishing iron and burnishes the same, as illustrated in Fig. 13, then tips the shoe to the position shown in Fig. 14 and sets the toe portion of the sole, then rotates the shoe to the position illustrated in Fig. 15 and sets the other side of the fore part, then returns the shoe to the shank burnishing iron and burnishes the other side of the shank, as illustrated in Fig. 16, and finally sets and burnishes that portion adjacent to the other side of the heel breast against the stationary iron by pushing the shoe against the iron, as illustrated in Fig. 17. The shoe is now brushed by the operator and this is done by placing the same against the periphery of the brush in the position illustrated in Fig. 18, the shoe being placed above the brush and pushed downwardly thereagainst. The shoe is then carried around, brushing the toe portion and then tipped and carried downwardly upon the opposite side of the shoe, as shown in Fig. 19. Thus all portions of the shoe sole are thoroughly brushed after having been set and burnished, as hereinbefore set forth. During the brushing of the shoe, the operator pressing downwardly upon the brush causes the same to move downwardly, rocking the shoe supporting arm 69 and lowering the same, together with the bracket 73 and the link 100, and thus rocking the rocker-arms 96 and 97 downwardly, thus releasing the rocker-arm 92 by the downward movement of the pin 99 which moves away from the under side of said rocker-arm and allows said rocker-arm to descend until the wax 91 is brought into contact with the periphery of the fore part edge burnishing iron 44, and thus at this time supplies wax to the edge burnishing iron for the next shoe to be burnished or set. As soon as the operator removes the shoe from the brush the spring 70 raises the brush supporting arm 69 and the bracket 73 until the movable guard 74 strikes the stationary guard 75. At the same time the link 100 will be moved upwardly, thus lifting the rocker-arms 96 and 97 and the pin 99 will then lift the rocker-arm 92 until the wax is moved away from the periphery of the fore part edge burnishing iron. If desired, the operator may, at any time, supply more wax to the periphery of the edge burnishing iron by depressing the treadle 86, which, through the chain 85, will depress the bracket 73 and the arm 69, thus, through the connecting link 100, depressing the rocker-arms and allowing the wax to come in contact with the periphery of the edge burnishing iron for any length of time which the operator may desire, so that it will be evident that the wax may be applied either by pressure upon the brush to depress said brush or by using the treadle.

While the brushing operation is taking place the operator presses the sole of the shoe against the stationary and movable guards 75 and 74 and the sole of the shoe rests on the periphery of the brush. In brushing the shoe, as will be seen by reference to Figs. 18 and 19, the operator starts to brush from the toe to the heel then draws the shoe out to the toe again and then raises the heel and brushes the other side of the shoe to the heel. To allow the shoe to be brushed up to the heel, it has been found necessary to curve the front portion of the stationary guard 75, as shown at 76, to prevent said guard from catching on the breast of the heel. In setting the edge of a very long shoe, if the operator finds there is not sufficient wax to cover the edge well, he may apply more wax by pressing upon the treadle 86 and thus obtain all the wax necessary. There may be certain cases where the shoes would not be brushed and in such cases the operator could apply wax by means of the treadle 86.

While it is desirable that the machine should be constructed with a brush movable upwardly and downwardly and by this movement allowing the wax to be applied to the periphery of the edge setting tool, it is evident that the brush might be mounted upon a stationary support or holder and in such case the wax could be applied by means of the treadle, the link 100 in such case being connected to the treadle 96 instead of to the arm 69.

An important feature in this machine is the bristle support, viz., the flange 106 on the pulley 67 and by means of this flange the bristles upon the brush are kept in shape instead of allowing them to spread out while the brushing is being done and thereby losing some of their brushing power. They are held up and a compact mass of bristles presented to the edge of the shoe, so that the brushing of the shoe will be performed in a much more satisfactory manner than without said supporting flange, and further by its use a cheaper and softer brush may be employed. It is evident that when one side of the brush is worn off the same may be reversed and the other side of the brush used, said brush being reversibly attached to the flange 106. It will be noted that said flange 106 is placed slightly back of or at one side of the face of the guards 74 and 75, so that the outer face of the flange is about one-quarter inch back from the plane in which the outer faces of the guards 74 and 75 are located. In other words, the face of the flange should be placed far enough back of the face of the guards so that when the shoe is being brushed, with the tread of the sole against said guards 74 and 75, the edge of the shoe cannot come in contact with the flange 106.

In the setting operation hereinbefore set forth, it will be noted that in setting the toe of the shoe, the operator grasps the sole of the shoe, near the toe thereof and passes it around under the revolving hot iron 44 and by resting his fore finger against the leather 58 he can apply a steady pressure, with no fear of burning or injuring his hand from contact with the hot iron. Also in burnishing the shank, the loop of leather 65 which also produces heat for the shank iron, serves to protect the upper of the shoe from being injured by the rotating shank iron when the fore part iron is used to set the edge up to the heel, as is sometimes done when the shoes are trimmed with a square shank on the outside edge the same as the fore part. If it were not for the leather 65 around the shank iron the upper would be liable to be touched by said shank iron and injured, unless the fore part iron were made large enough in diameter to keep the shank iron away from the upper and this would not be practical, as the difference in diameter would be too great between the two irons.

In using the stationary edge burnishing iron, as hereinbefore set forth, it will be understood that the iron is heated and that the operator pulls the shoe with an upward pressure of the sole against the iron until the iron touches the corner, thus finishing the shank portion of the sole to the extreme corner of the breast of the heel, which has never been done before on any machine. In finishing the opposite side of the shank, the operator, after turning the shoe over as hereinbefore described, pushes the same from him, as in Fig. 17, first placing the shoe against the iron at about the same distance from the corner as he did on the opposite side of the shoe and using the corner of the edge burnishing iron nearest to him. With an iron heated as hereinbefore described, one motion is usually sufficient to finish the corner of the shank nicely right up to the breast of the heel.

It is very desirable in machines of the particular style illustrated in the drawings of this application and also in other styles of edge burnishing and setting machines that the stationary edge burnishing iron 101 shall be placed very near the shank burnishing iron and immediately above the same, in order that the workman may move the shoe with the least loss of time from one of said irons to the other and in Figs. 20 and 21 I have shown a modified arrangement and construction of the edge burnishing iron in which 101' is the stationary edge burnishing iron and 42 is the shank burnishing iron, being the same as that shown in the other figures of the drawings, but the edge burnishing iron being made wider between its flat faces, the distance between said flat faces being greater than the diameter of the shank burnishing iron 42 and the reason for this is that when the edge burnishing iron is located very near the shank burnishing iron, as illustrated in Fig. 20, it will be necessary that the distance between the opposite flat faces of said stationary edge burnishing iron shall be greater than the diameter of the rotary shank burnishing iron, in order to prevent the breast of the heel of the shoe from contacting with said rotary shank burnishing iron when the stationary iron 101' is being used for the purpose for which it is intended. This is clearly illustrated in Fig. 21 in which a shoe is shown dotted to illustrate the purpose of making the distance between the flat faces upon the stationary edge burnishing iron greater than the diameter of the rotary shank burnishing iron.

Having thus described my invention, what I claim and desire by Letters Patent to secure is:

1. A machine for setting and burnishing the edges of the soles of boots and shoes having, in combination, a uniting shaft journaled to rotate in permanent bearings in the frame of said machine, an edge burnishing iron fast to said shaft, an auxiliary bearing for said shaft located between said burnishing iron and one of said permanent bearings, and means forming a universal support connecting said auxiliary bearing to said frame.

2. A machine for setting and burnishing the edges of the soles of boots and shoes having, in combination, a rotary edge burnishing iron, a stationary rest for the finger consisting of a strap encircling a portion of said iron and projecting therebelow, and means to press said strap against said iron with a resilient pressure.

3. A machine for setting and burnishing the edges of the soles of boots and shoes having, in combination, a rotary edge burnishing iron, a flexible strap extending partly around and beneath a portion of said iron and arranged to form a rest for the finger, and means connected to the ends of said strap whereby said strap may be pressed against said iron.

4. A machine for setting and burnishing the edges of the soles of boots and shoes having, in combination, a rotary edge burnishing tool, a brush, a movable support upon which said brush is journaled, a wax holder and means regulated by said movable support to determine the position of said holder and the wax held therein relatively to said edge burnishing tool.

5. A machine for setting and burnishing the edges of the soles of boots and shoes having, in combination, a rotary edge burnishing tool, a brush, a movable support upon which said brush is journaled, a holder for a piece of wax, and means regulated by said movable support to determine the position of said wax relatively to said edge burnishing tool.

6. A machine for setting and burnishing the edges of the soles of boots and shoes having, in combination, a rotary edge burnishing tool, a brush, a movable support upon which said brush is journaled, a holder for a piece of wax, adapted to be moved by gravity to bring said wax into contact with the periphery of said edge burnishing tool, and means operated by said movable support to move said wax holder away from said edge burnishing tool.

7. A machine for setting and burnishing the edges of the soles of boots and shoes, having, in combination, a rotary edge burnishing tool, a brush, a rocker-arm upon which said brush is journaled, a holder for a piece of wax adapted to be moved by gravity to bring said wax into contact with the periphery of said edge burnishing tool, and means operated by said rocker-arm to move said wax holder away from said edge burnishing tool.

8. A machine for setting and burnishing the edges of the soles of boots and shoes having, in combination, a rotary edge burnishing tool, a brush, a rocker-arm upon which said brush is journaled, a second rocker-arm adapted to hold a piece of wax, a third rocker-arm adapted to engage said second rocker-arm and move the same with said wax away from said rotary edge burnishing tool, and means connecting said third rocker-arm to said brush rocker-arm.

9. A machine for setting and burnishing the edges of the soles of boots and shoes having, in combination, a rotary edge burnishing tool, a brush, a movable support upon which said brush is journaled, a holder for a piece of wax, means regulated by said movable support to determine the position of said wax relatively to said edge burnishing tool, a treadle, and means connecting said treadle to said movable support, whereby when said treadle is moved in one direction said wax may be moved into contact with said edge burnishing tool and vice versa.

10. A machine for setting and burnishing the edges of the soles of boots and shoes having, in combination, a rotary edge burnishing tool, a brush, a rocker-arm upon which said brush is journaled, a holder for a piece of wax, and means regulated by said rocker-arm to determine the position of said wax relatively to said edge burnishing tool, a spring adapted to move said rocker-arm in one direction, a treadle connected to said rocker-arm and adapted to move the same in the opposite direction, and stops to limit the movement of said rocker-arm in opposite directions, respectively, whereby when said rocker-arm is moved in one direction said wax may be moved into contact with said edge burnishing tool and vice versa.

11. A machine for setting and burnishing the edges of the soles of boots and shoes having, in combination, a rotary edge burnishing tool, a rocker arm constituting a holder for a piece of wax adapted to be moved by gravity to bring said wax into contact with the periphery of said edge burnishing tool, a treadle, and a second rocker-arm connected to said treadle and adapted to move said wax holding rocker-arm and the wax thereon away from said edge burnishing tool during the burnishing operation.

12. A machine for setting and burnishing the edges of the soles of boots and shoes having, in combination, a brush, a rocker-arm upon which said brush is journaled to rotate, a driving shaft upon which said rocker-arm is pivoted and pulleys fast to said brush and driving shaft, respectively, whereby said brush may be rotated while said rocker-arm is rocked, a rotary edge burnishing tool, a wax holder and means regulated by said rocker arm to determine the position of said holder and the wax held therein relatively to said edge burnishing tool.

13. A machine for setting and burnishing the edges of the soles of boots and shoes having, in combination, a brush, a rocker-arm upon which said brush is journaled to rotate, a driving shaft upon which said rocker-arm is pivoted, pulleys fast to said brush and driving shaft, respectively, whereby said brush may be rotated while said rocker-arm is rocked, a spring acting to move the free end of said arm upwardly, and a stop to limit said upward movement, a rotary edge burnishing tool, a wax holder and means regulated by said rocker arm to determine the position of said holder and the wax held therein relatively to said edge burnishing tool.

14. A machine for setting and burnishing the edges of the soles of boots and shoes having, in combination a brush, a rocker-arm upon which said brush is journaled to rotate, a driving shaft upon which said rocker-arm is pivoted, pulleys fast to said brush and driving shaft, respectively, whereby said brush may be rotated while said rocker-arm is rocked, a treadle connected to said arm and adapted to move the same downwardly, and a stop to limit the downward movement of said rocker-arm, a rotary edge burnishing tool, a wax holder and means regulated by said rocker arm to determine the position of said holder and the wax held therein relatively to said edge burnishing tool.

15. A machine for setting and burnishing the edges of the soles of boots and shoes having, in combination, a shaft, an edge burnishing iron and a pulley fast to said shaft, a brush, a pulley fast to said brush, a rocker-arm upon which said brush is journaled to rotate, a driving shaft, and pulleys on said driving shaft, whereby said brush and edge burnishing iron may be rotated while said rocker-arm is rocked.

In testimony whereof I have hereunto set my hand in presence of two subscribing witnesses.

ZOTIQUE BEAUDRY.

Witnesses:
 LOUIS A. JONES,
 SADIE V. MCCARTHY.